(12) United States Patent
Higashi

(10) Patent No.: US 9,232,101 B2
(45) Date of Patent: Jan. 5, 2016

(54) DATA PROCESSING APPARATUS AND CONTROL METHOD FOR SHIFTING BETWEEN STANDBY, SUSPENDED, AND POWER-OFF STATES

(75) Inventor: Hidenori Higashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 240 days.

(21) Appl. No.: 13/551,035

(22) Filed: Jul. 17, 2012

(65) Prior Publication Data

US 2013/0047019 A1 Feb. 21, 2013

(30) Foreign Application Priority Data

Aug. 17, 2011 (JP) .................. 2011-178491

(51) Int. Cl.
*H04N 1/00* (2006.01)
*G06F 1/32* (2006.01)
*G06F 3/12* (2006.01)

(52) U.S. Cl.
CPC .......... *H04N 1/00904* (2013.01); *G06F 1/3206* (2013.01); *G06F 1/3284* (2013.01); *G06F 3/1221* (2013.01); *G06F 3/1229* (2013.01); *H04N 1/00891* (2013.01); *H04N 1/00896* (2013.01); *Y02B 60/1267* (2013.01); *Y02B 60/1271* (2013.01)

(58) Field of Classification Search
CPC .. G06F 1/3206; G06F 1/3284; H04N 1/00904
USPC .......................... 713/320, 323, 330; 358/1.14
See application file for complete search history.

(56) References Cited

U.S. PATENT DOCUMENTS

| | | | |
|---|---|---|---|
| 7,412,565 B2* | 8/2008 | Wirasinghe et al. | .......... 711/122 |
| 7,681,058 B2 | 3/2010 | Kimura | |
| 7,739,528 B2* | 6/2010 | Zhuang et al. | ................ 713/320 |
| 7,752,474 B2* | 7/2010 | Keller et al. | .................. 713/324 |
| 8,370,664 B2 | 2/2013 | Yamaguchi | |
| 8,806,251 B2 | 8/2014 | Yamaguchi | |
| 2004/0103345 A1* | 5/2004 | Dunstan | .......................... 714/24 |
| 2006/0059380 A1* | 3/2006 | Kimura | ......................... 713/323 |
| 2007/0277051 A1* | 11/2007 | Reece et al. | .................. 713/323 |
| 2008/0028243 A1 | 1/2008 | Morisawa | |
| 2008/0141051 A1* | 6/2008 | Lee et al. | ....................... 713/323 |
| 2010/0131789 A1 | 5/2010 | Kimura | |
| 2010/0325458 A1 | 12/2010 | Yamaguchi | |
| 2011/0037999 A1 | 2/2011 | Sano | |
| 2011/0280608 A1* | 11/2011 | Amemiya et al. | .............. 399/88 |
| 2013/0011246 A1 | 1/2013 | Todorovic | |
| 2014/0304539 A1 | 10/2014 | Kimura | |

FOREIGN PATENT DOCUMENTS

| | | |
|---|---|---|
| JP | 11-194846 A | 7/1999 |
| JP | 2006-079468 A | 3/2006 |

(Continued)

*Primary Examiner* — Stefan Stoynov
(74) *Attorney, Agent, or Firm* — Fitzpatrick, Cella, Harper & Scinto

(57) ABSTRACT

When a data processing apparatus according to this invention detects generation of an event to shift from the standby state to the suspended state, it saves the contents of a memory in the standby state in a non-volatile storage device in response to detection of generation of the event, and shifts to the suspended state. When power-off is instructed in the suspended state, the data processing apparatus shifts from the suspended state to the power-off state without the mediacy of the standby state.

8 Claims, 7 Drawing Sheets

(56) References Cited

FOREIGN PATENT DOCUMENTS

| JP | 2006-095741 A | 4/2006 |
| JP | 2008-033436 A | 2/2008 |
| JP | 2011-000852 A | 1/2011 |
| JP | 2011-041016 A | 2/2011 |

* cited by examiner

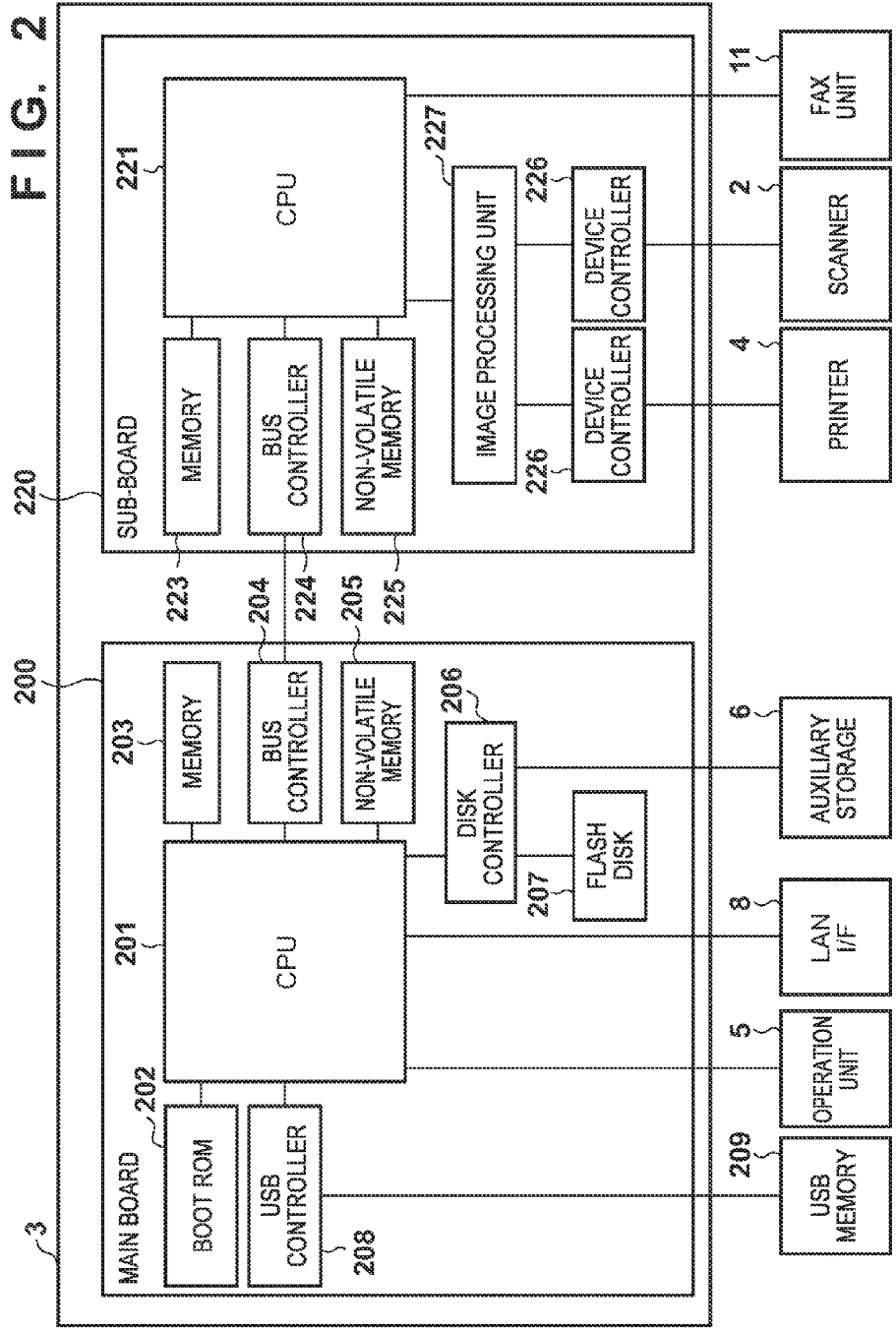

FIG. 3A
FIG. 3B
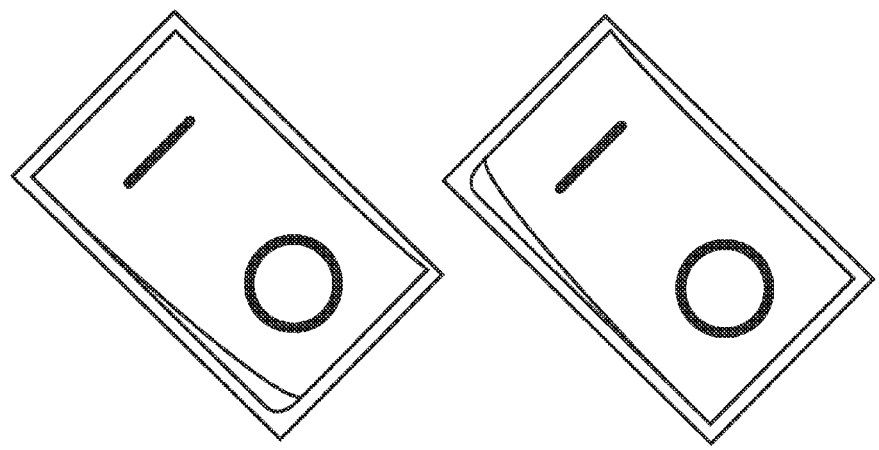
FIG. 4
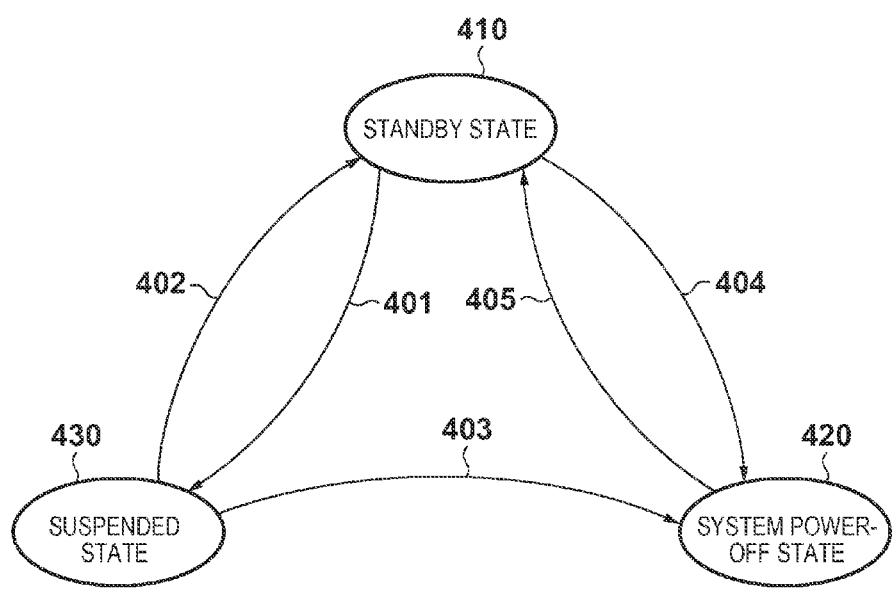

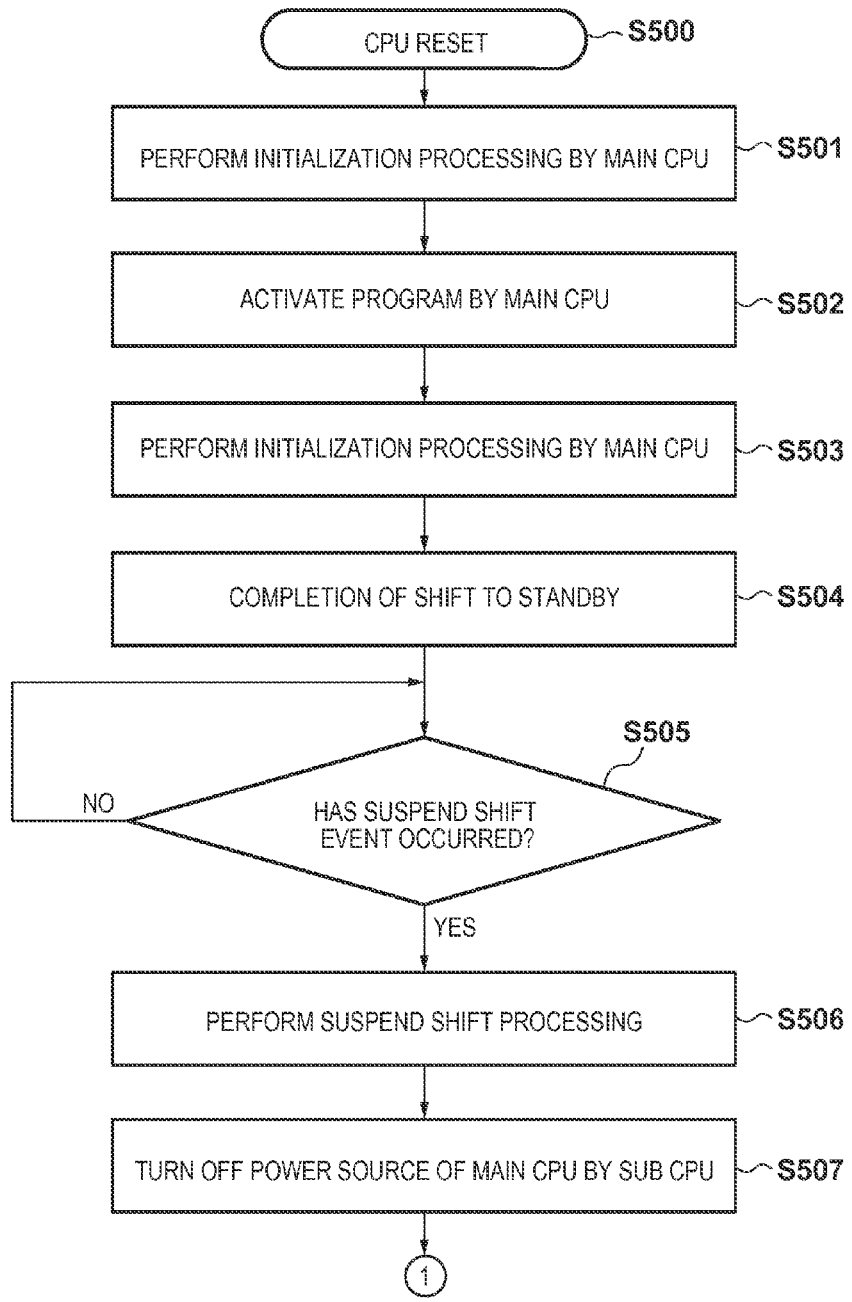

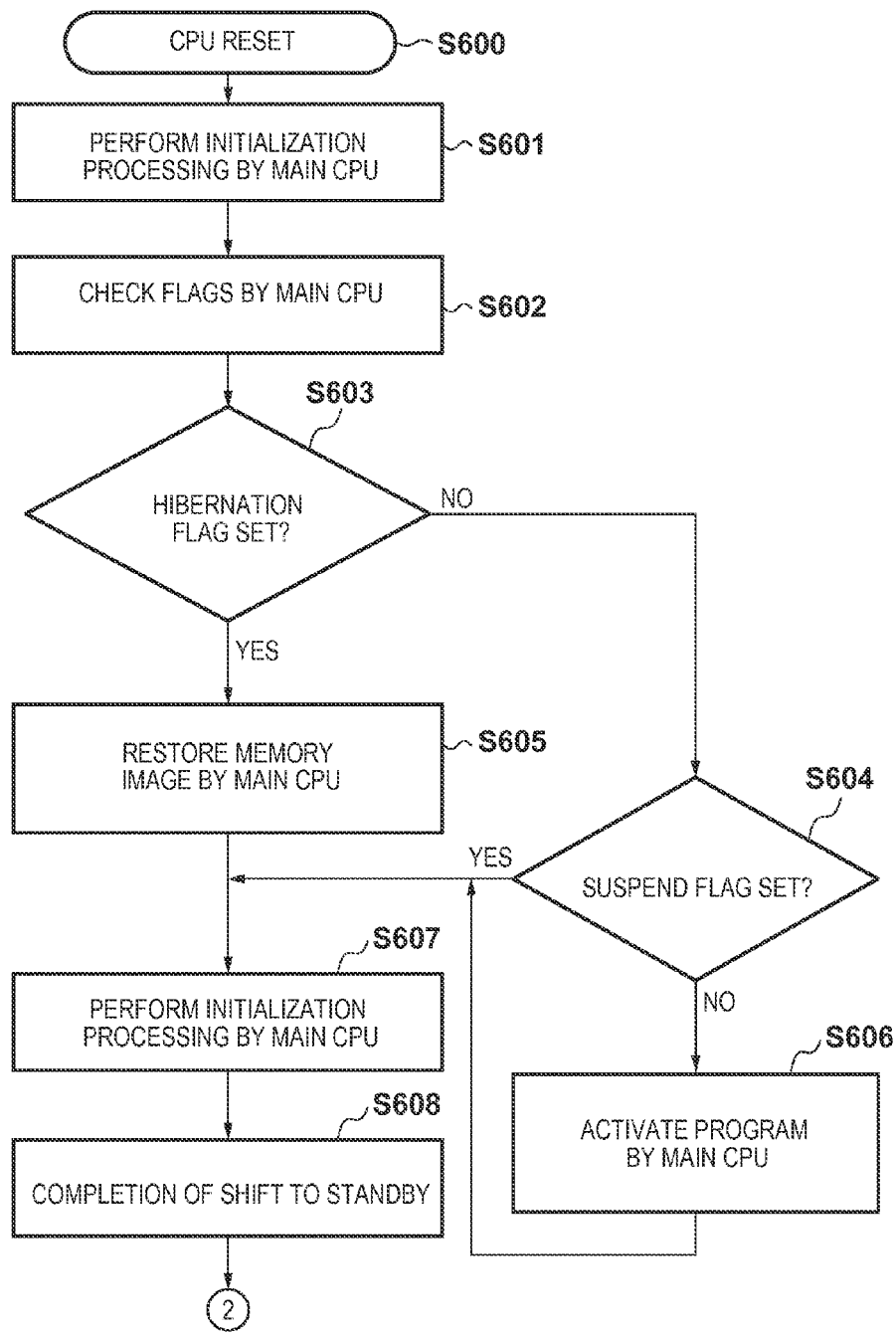

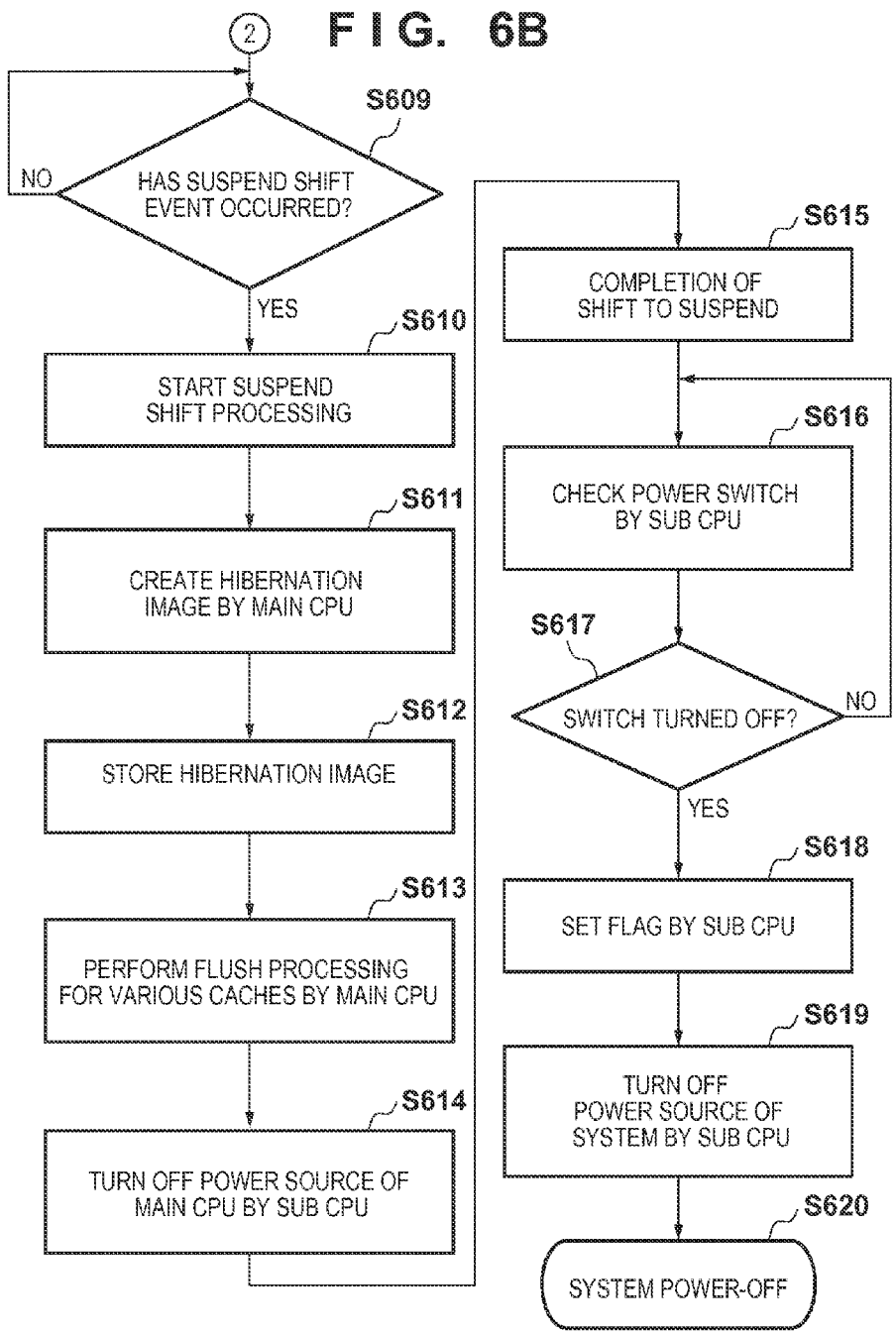

DATA PROCESSING APPARATUS AND CONTROL METHOD FOR SHIFTING BETWEEN STANDBY, SUSPENDED, AND POWER-OFF STATES

BACKGROUND OF THE INVENTION

1. Field of the Invention

The present invention relates to a data processing apparatus which can take a standby state in which a job can be executed, and a suspended state serving as a power saving state, and a control method therefor.

2. Description of the Related Art

Recently, image forming apparatuses which have a power saving mode are becoming popular. An image forming apparatus of this type implements the power saving mode by reducing (or shutting down) the power supply to a main control unit, which controls the image forming apparatus when the image forming apparatus shifts to a non-standby state, from a normal state.

Also, recent image forming apparatuses include an auxiliary storage device (for example, a hard disk) as standard equipment. The auxiliary storage device can hold user data, and save temporary data to be used when forming an image, or to be used in each processing to be executed by the image forming apparatus.

Under the circumstances, a demand has arisen for an image forming apparatus capable of quickly shifting from a power saving state to a power-off state by a combination of the power saving mode and an auxiliary storage device. Another demand has also arisen for an image forming apparatus capable of quickly shifting to a standby state after power-on again, after shifting from a power saving state to a power-off state. For example, in Japanese Patent Laid-Open No. 11-194846, when a battery-driven information processing apparatus shifts to a low-battery state during a sleep operation, it temporarily returns to the standby state, and executes a hibernation operation to create a hibernation image and save it in an auxiliary storage device.

In the technique disclosed in Japanese Patent Laid-Open No. 11-194846, when power supply from an internal battery or external power source stops during the suspension period, the BIOS is notified of this as a wakeup event. After the contents of the memory are saved in a hibernation area within the hard disk, the information processing apparatus is turned off. In this manner, the system state shifts from the suspended state to the hibernation state, thereby controlling the system state so as not to lose information even in a low-battery state.

In the technique disclosed in Japanese Patent Laid-Open No. 11-194846, when the user turns off the image forming apparatus in the suspended state, the system state temporarily returns from the suspended state to the standby state, and then the image forming apparatus is turned off. Hence, when the image forming apparatus in the suspended state shifts to the power-off state, it temporarily returns to the standby state and thus takes time, compared to directly shifting from the suspended state to the power-off state.

In general, when the user performs an operation to turn off the image forming apparatus, he may think that power-off has been completed by this operation. In some cases, the user may remove the power cord from the outlet during shutdown processing. If the power cord is removed during shutdown processing, a logical fault may occur in the auxiliary storage device.

When the user performs an operation to turn off the image forming apparatus in the suspended state, the image forming apparatus can stop power supply and quickly shift to the power-off state without performing shutdown processing. In this case, however, upon power-on at a later time, the image forming apparatus is activated while executing an inconsistency check, because flush processing for various caches that should be executed during shutdown processing has not been performed. For this reason, the time taken to shift from the power-off state to the standby state becomes very long.

SUMMARY OF THE INVENTION

The present invention is to solve the conventional problems of the art. The present invention provides a technique of quickly shifting to the power-off state when a data processing apparatus in the suspended state shifts to the power-off state.

According to one aspect of the present invention, there is provided a data processing apparatus including a standby state in which a job is executable and a suspended state in which power consumption is smaller than power consumption in the standby state, comprising: a detection unit configured to detect generation of an event to shift the data processing apparatus from the standby state to the suspended state; a shift unit configured to, in response to detection of generation of the event by the detection unit, save a content of a memory in the standby state in a non-volatile storage device, and shift the data processing apparatus to the suspended state; a control unit configured to, when power-off is instructed in the suspended state, shift the data processing apparatus from the suspended state to a power-off state without shifting to the standby state; and an activation unit configured to restore the saved content in the memory when the content of the memory has been saved in the non-volatile storage device in activating the data processing apparatus from the power-off state to a power-on state.

According to another aspect of the present invention, there is provided a control method for a data processing apparatus including a standby state in which a job is executable and a suspended state in which power consumption is smaller than power consumption in the standby state, comprising: detecting generation of an event to shift the data processing apparatus from the standby state to the suspended state; in response to detection of generation of the event, saving a content of a memory in the standby state in a non-volatile storage device, and shifting the data processing apparatus to the suspended state; when power-off is instructed in the suspended state, shifting the data processing apparatus from the suspended state to a power-off state without shifting to the standby state; and restoring the saved content in the memory when the content of the memory has been saved in the non-volatile storage device in activating the data processing apparatus from the power-off state to a power-on state.

According to the present invention, the time taken to shift the data processing apparatus in the suspended state to the power-off state can be shortened. In addition, the data processing apparatus can be quickly activated in the next activation after the data processing apparatus in the suspended state shifts to the power-off state.

Further features of the present invention will become apparent from the following description of exemplary embodiments (with reference to the attached drawings).

BRIEF DESCRIPTION OF THE DRAWINGS

FIG. 2 is a block diagram showing the arrangement of the control unit of the image forming apparatus according to the embodiment of the present invention;

FIGS. 3A and 3B are views for explaining a power switch attached to the power source of the image forming apparatus according to the embodiment of the present invention;

FIG. 4 is a view showing state transition of the image forming apparatus according to the embodiment of the present invention;

FIGS. 5A and 5B are flowcharts for explaining a conventional processing sequence; and FIGS. 6A and 6B are flowcharts for explaining a processing sequence by the image forming apparatus according to the embodiment of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention. Note that the embodiment will explain an image forming apparatus such as a multi-function peripheral as an example of a data processing apparatus according to the present invention. However, the present invention is not limited to this apparatus.

Figure 1:
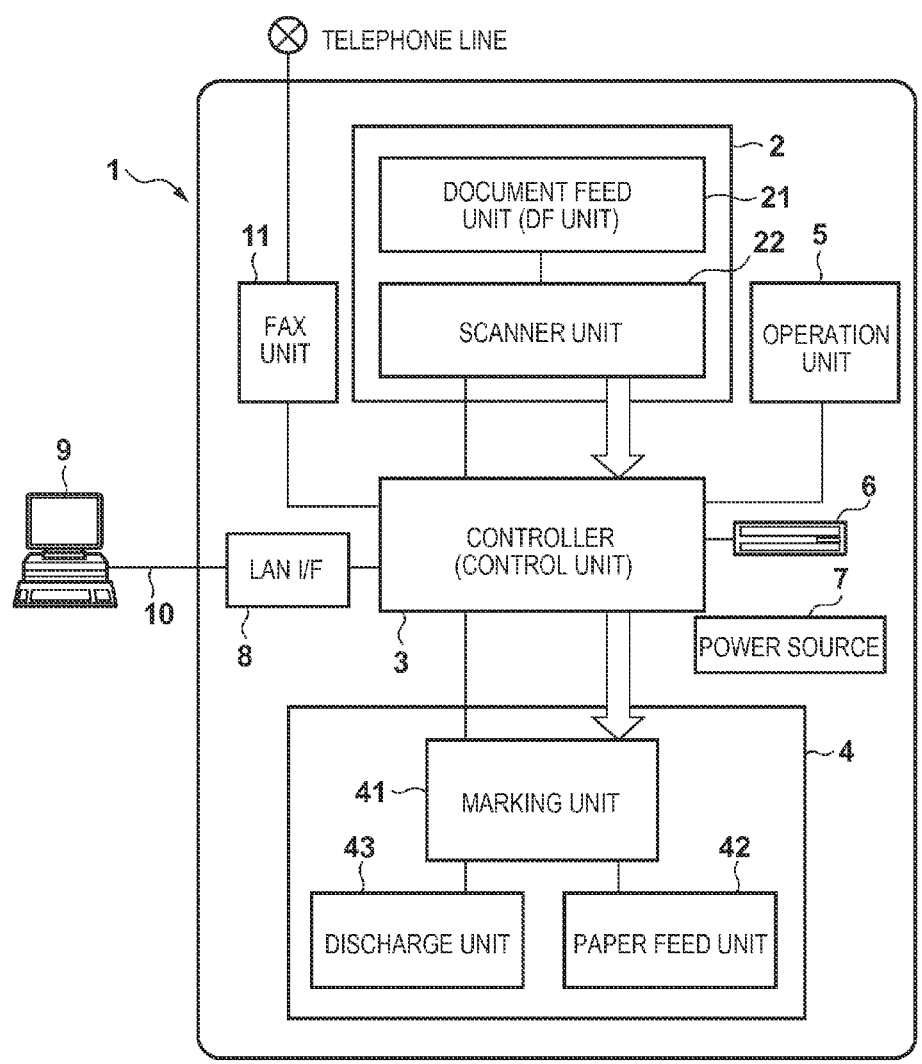
FIG. 1 is a block diagram showing the arrangement of an image forming apparatus according to an embodiment of the present invention.

FIG. 1 is a block diagram showing the arrangement of an image forming apparatus 1 according to the embodiment.

A scanner 2 optically reads a document image and converts it into a digital image. A printer 4 prints (forms) an image based on the digital image on paper. An operation unit 5 is used when the user operates the image forming apparatus 1. A hard disk (auxiliary storage) 6 stores digital images, control programs, and the like. A power source 7 controls power supply to the scanner 2, the printer 4, a control unit 3, and the like. The control unit 3 is connected to these modules, and issues instructions to the respective modules to execute various jobs in the image forming apparatus 1. The image forming apparatus 1 can receive/output a digital image from a computer 9 via a LAN 10, and issue a job, device instruction, and the like. The LAN 10 and control unit 3 are connected via a LAN interface (I/F) 8.

The scanner 2 includes a document feed unit 21 which sequentially conveys stacked document sheets and feeds them to a scanner unit 22, and the scanner unit 22 which optically scans the fed document sheet and converts it into a digital image. The scanner 2 sends the generated image data to the control unit 3.

The printer 4 includes a marking unit 41 for printing an image based on image data on fed paper (sheet), a paper feed unit 42 capable of feeding sheets one by one from a sheet bundle, and a discharge unit 43 for discharging a printed sheet. A FAX unit 11 can perform facsimile transmission/reception to/from another apparatus having the FAX function via a telephone line.

FIG. 2 is a block diagram showing the arrangement of the control unit 3 of the image forming apparatus 1 according to the embodiment.

The control unit 3 includes a main board 200 and sub-board 220.

The main board 200 is a so-called general-purpose CPU system. The main board 200 includes a CPU 201 which controls the overall main board, a boot ROM 202 which stores a boot program, a memory 203 used as a work memory by the CPU 201, and a bus controller 204 having a bridge function with an external bus. The main board 200 further includes a non-volatile memory 205 whose storage contents are not lost even when power supply is shut down, a disk controller 206 which controls the auxiliary storage 6, and a flash disk (for example, SSD) 207 serving as a storage device which is formed from a semiconductor device and has a relatively small capacity. The operation unit 5, auxiliary storage (non-volatile storage device) 6, LAN I/F 8, and the like are connected to the main board 200. Further, a USB memory 209 is connectable to the main board 200 via a USB controller 208.

The sub-board 220 includes a relatively small-scale general-purpose CPU system and image processing hardware. The sub-board 220 includes a CPU 221 which controls the overall sub-board 220, a memory 223 used as a work memory by the CPU 221, a bus controller 224 having a bridge function with an external bus, and a non-volatile memory 225 whose storage contents are not lost even when power supply is shut down. The sub-board 220 further includes an image processing unit 227 which executes digital image processing in real time, and device controllers 226 which control the scanner 2 and printer 4. The CPU 221 is connected to the FAX unit 11.

FIG. 2 is a block diagram and shows the simplified arrangement of the control unit 3. For example, each of the CPUs 201 and 221 includes many CPU peripheral hardware components such as a chip set, bus bridge, and clock generator. However, these components are not illustrated for descriptive convenience, and this block arrangement does not limit the present invention.

Next, the operation of the control unit 3 will be explained by exemplifying the copying of an image on paper.

When the user instructs the copying of an image via the operation unit 5, the CPU 201 sends an image reading instruction to the scanner 2 via the CPU 221. Then, the scanner 2 optically scans a document, converts the document image into digital image data, and inputs the digital image data to the image processing unit 227 via the device controller 226. The image processing unit 227 transfers the processed image data to the memory 223 by DMA, temporarily saving it. After the CPU 201 confirms that a predetermined amount or all of the digital image data have been stored in the memory 223, it issues an image printing instruction to the printer 4 via the CPU 221. The CPU 221 instructs the image processing unit 227 about the position of the image data in the memory 223. Image data stored in the memory 223 is transmitted to the printer 4 via the image processing unit 227 and device controller 226 in accordance with a sync signal from the printer 4. Then, the printer 4 prints an image based on the digital image data on paper. When printing a plurality of copies, the CPU 201 saves, in the auxiliary storage 6, image data in the memory 223. For the second and subsequent copies, the image data can be transmitted from the auxiliary storage 6 to the printer 4 to print an image based on the image data on paper without transferring the image from the scanner 2.

FIGS. 3A and 3B are views for explaining a power switch attached to the power source 7 of the image forming apparatus 1 according to the embodiment. FIG. 3A shows the ON state of the power switch, and FIG. 3B shows the OFF state of the power switch.

FIG. 4 is a view showing state transition of the image forming apparatus 1 according to the embodiment.

The image forming apparatus 1 in a standby state 410 in which a job can be executed changes to a suspended state (power saving state) 430 upon generation of a transition event to the suspended state 430 in which power consumption is less than that in the standby state 410 (401). Examples of the transition event to the suspended state 430 are an operation by the user and the lapse of a predetermined time based on the timer.

The image forming apparatus 1 in the suspended state 430 changes to the standby state 410 upon generation of a transition (shift) event to the standby state 410 (402). Examples of the transition event to the standby state 410 are reception of a job, an operation by the user, and measurement of a predetermined time by the timer.

The image forming apparatus 1 in the suspended state 430 changes to a system power-off (power-off) state 420 upon generation of a transition event to the system power-off state 420 (403). An example of the transition event to the system power-off state 420 is an operation by the user.

The image forming apparatus 1 in the system power-off state 420 changes to the standby state 410 upon generation of a transition event to the standby state 410 (405). Examples of the transition event to the standby state 410 are an operation by the user and measurement of a predetermined time by the timer.

Further, the image forming apparatus 1 in the standby state 410 changes to the system power-off state 420 upon generation of a transition event to the system power-off state 420 (404). Examples of the transition event to the system power-off state 420 are an operation by the user and measurement of a predetermined time by the timer.

Figure 5B:
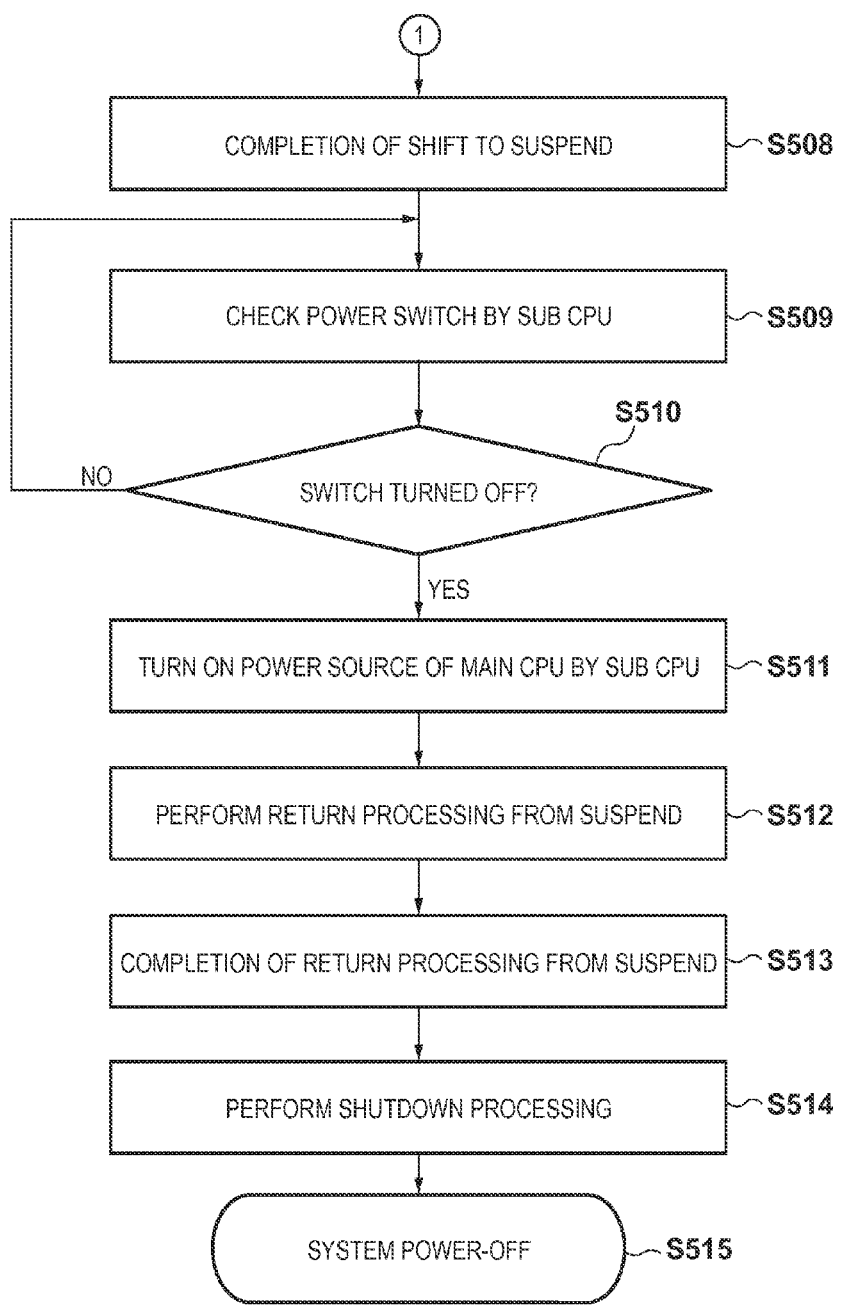

FIGS. 5A and 5B are flowcharts for explaining a conventional processing sequence.

In step S500, a CPU reset signal is input to the main CPU and sub CPU of the image forming apparatus by a power switch operation by the user or the like. The process advances to step S501, and the main CPU executes initialization processing necessary to activate a program, and activates a program stored in the auxiliary storage or the like in step S502. The main CPU performs initialization processing in step S503 according to the activated program, and the image forming apparatus shifts to the standby state in step S504.

If a suspend shift event occurs in step S505 after the shift to the standby state, the process advances to step S506, and the image forming apparatus shifts from the standby state to the suspended state. Examples of the suspend shift event are an operation by the user and timer processing. After the shift to the suspended state, the process advances to step S507, and the sub CPU stops power supply to the main CPU. At this time, power supply to the memory continues, and the storage contents of the memory are held. The processes in steps S506 to S508 correspond to processing represented by reference numeral 401 of FIG. 4.

Upon completion of the shift of the image forming apparatus to the suspended state in step S508, the process advances to step S510, and the sub CPU checks whether the power switch has been turned off. If the power switch has been turned off, the process advances to step S511, and the sub CPU starts power supply to the main CPU. In step S512, the main CPU performs return processing to return the image forming apparatus from the suspended state to the standby state. The processes in steps S511 and S512 correspond to processing represented by reference numeral 402 of FIG. 4.

Upon completion of the return processing from the suspended state in step S513, the main CPU performs shutdown processing in step S514. In response to this, the image forming apparatus changes to the system power-off state in step S515. The processing in steps S514 corresponds to processing represented by reference numeral 404 of FIG. 4.

In the conventional processing, when the power switch of the image forming apparatus in the suspended state is turned off, it is necessary to supply power to the main CPU, return the image forming apparatus from the suspended state to the standby state, and then perform shutdown processing. That is, the image forming apparatus shifts from the suspended state 430 to the system power-off state 420 not by the processing represented by reference numeral 403 of FIG. 4 but by the processing represented by reference numerals 402 and 404 of FIG. 4.

FIGS. 6A and 6B are flowcharts for explaining a processing sequence by the image forming apparatus 1 according to the embodiment of the present invention. Of programs which execute this processing, a program which executes processing by the main CPU 201 is stored in the auxiliary storage 6, and a program which executes processing by the sub CPU 221 is stored in the non-volatile memory 225. The main CPU 201 and sub CPU 221 execute these programs, respectively.

First, in step S600, a CPU reset signal is input to the main CPU 201 and sub CPU 221 of the image forming apparatus 1 by a power switch operation (power-on) by the user or the like. The process then advances to step S601, and the main CPU 201 executes initialization processing necessary to activate a program, and checks flags stored in the non-volatile memory 205 or non-volatile memory 225 in step S602. The embodiment exemplifies a case in which flags are held in the non-volatile memory 205 or non-volatile memory 225. However, the present invention is not limited to this.

If a hibernation flag in the non-volatile memory 205 or non-volatile memory 225 is not set in step S603, and a suspend flag is not set, the process advances to step S606, and the main CPU 201 activates a program stored in the auxiliary storage 6 or the like. The process advances to step S607 to perform initialization processing according to the activated program. If the suspend flag is set in step S604, that is, the image forming apparatus 1 is to return from the suspended state to the standby state, the process advances to step S607, and the main CPU 201 performs initialization processing.

If the hibernation flag is set in step S603, the process advances to step S605, and the main CPU 201 restores a memory image saved in the auxiliary storage 6 or the like to return the image forming apparatus 1 to a state set when the power source was turned off. The process then advances to step S607 to perform initialization processing. Note that the hibernation flag is set in step S612 or S618 to be described later.

After executing step S607, the process advances to step S608, and the image forming apparatus 1 completes the shift to the standby state. The process advances to step S609, and upon generation of a shift event to the suspended state, to step S610, and the main CPU 201 starts shift processing from the standby state to the suspended state. The shift event occurs when, for example, the user does not operate the image forming apparatus 1 for a predetermined time or no job is input for a predetermined time. At this time, the main CPU 201 creates a hibernation image in step S611, stores it in the auxiliary storage 6 in step S612, and sets the hibernation flag in the non-volatile memory 205.

Thereafter, the process advances to step S613, and the main CPU 201 executes flush processing for various caches (arranged in the memory 203) that is executed in normal shutdown processing. The process advances to step S614, and the sub CPU 221 stops power supply to the main CPU 201, completing the shift of the image forming apparatus 1 to the suspended state. At this time, power supply to the memory 203 continues, and the contents of the memory 203 are held. The processes in steps S610 to S615 correspond to processing represented by reference numeral 401 of FIG. 4.

Then, the process advances to step S616, and the sub CPU 221 checks whether the power switch has been turned off. If the power switch is ON, the sub CPU 221 repeats the check at a predetermined interval. If the sub CPU 221 detects in step S617 that the power switch has been turned off, the process advances to step S618, and the sub CPU 221 sets the hibernation flag and suspend flag in the non-volatile memory 225 so that the main CPU 201 activates the image forming apparatus 1 based on the hibernation image next time. The process advances to step S619, and the sub CPU 221 turns off the power source, and the image forming apparatus 1 changes to the system power-off state in step S620. The processes in steps S616 to S619 correspond to processing represented by reference numeral 403 of FIG. 4.

By the above-described processing, when the user performs an operation to turn off the power source of the image forming apparatus in the suspended state, the image forming apparatus can quickly shift to the power-off state. In the next activation after the power source is turned off in the suspended state, no inconsistency check need be executed in activating the program in step S606, and an image forming apparatus with a short activation time can be provided.

The contents described in the embodiment are merely an example of a solution to the problem, and does not limit the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-178491, filed Aug. 17, 2011, which is hereby incorporated by reference herein in its entirety.

What is claimed is:

1. An image forming apparatus including (a) a standby state in which a job is executable, and (b) a suspended state in which power consumption is smaller than power consumption in the standby state, the image forming apparatus comprising:
   a first control unit configured to control the image forming apparatus;
   a second control unit configured to control, according to a control by the first control unit, at least one of a scanner and a printer; and
   a receiving unit configured to receive a job to be processed by the scanner or the printer, the receiving unit being connected to a controller that includes the first control unit and the second control unit,
   wherein the receiving unit is configured to be able to receive the job while the image forming apparatus is in the suspended state,
   wherein the second control unit is configured to:
   (a) shift, if a predetermined event occurs, a state of the image forming apparatus from the standby state to the suspended state by turning off the first control unit and storing a process information of the image forming apparatus in a storage unit;
   (b) shift, if the reception unit receives the job while the image forming apparatus is in the suspended state, the state of the image forming apparatus from the suspended state to the standby state; and
   (C) shift, if turning off the image forming apparatus is instructed, the state of the image forming apparatus from the suspended state to a turned-off state, and
   wherein the first control unit is configured to restore the process information to the image forming apparatus if turning on the image forming apparatus is instructed while the image forming apparatus is in the turned-off state.

2. The image forming apparatus according to claim 1, wherein the second control unit is configured to shift, if the predetermined event occurs, the state of the image forming apparatus from the standby state to the suspended state by storing the process information of the image forming apparatus in a volatile storage unit, and
   wherein the first control unit is configured to:
   1) store the process information of the image forming apparatus in a non-volatile storage unit if the predetermined event occurs; and
   2) restore the process information from the non-volatile storage unit to the image forming apparatus if turning on the image forming apparatus is instructed while the image forming apparatus is in the turned-off state.

3. The image forming apparatus according to claim 2, wherein the second control unit is configured to set a flag in a case where turning off the image forming apparatus is instructed while the image forming apparatus is in the suspended state, and
   wherein the first control unit is configured to, in a case where the flag is set, restore, to the volatile storage unit, the process information stored in the non-volatile storage unit.

4. The image forming apparatus according to claim 1, wherein the first control unit is configured to, in a case where the predetermined event occurs while the image forming apparatus is in the standby state, execute flush processing for a cache arranged in the storage unit before the second control unit shifts the image forming apparatus to the suspended state.

5. A control method for an image forming apparatus including (a) a standby state in which a job is executable, and (b) a suspended state in which power consumption is smaller than power consumption in the standby state, the image forming apparatus comprising (i) a first control unit configured to control the image forming apparatus, (ii) a second control unit configured to control, according to a control by the first control unit, at least one of a scanner and a printer, and (iii) a receiving unit configured to receive a job to be processed by the scanner or the printer, the receiving unit being connected to a controller that includes the first control unit and the second control unit and being configured to be able to receive the job while the image forming apparatus is in the suspended state, the control method comprising:
   shifting, by the second control unit, if a predetermined event occurs, a state of the image forming apparatus from the standby state to the suspended state by turning off the first control unit and storing a process information of the image forming apparatus in a storage unit;
   shifting, by the second control unit, if the reception unit receives the job while the image forming apparatus is in the suspended state, the state of the image forming apparatus from the suspended state to the standby state;

shifting, by the second control unit, if turning off the image forming apparatus is instructed, the state of the image forming apparatus from the suspended state to a turned-off state; and restoring, by the first control unit, the process information to the image forming apparatus if turning on the image forming apparatus is instructed while the image forming apparatus is in the turned-off state.

6. The control method according to claim 5, wherein if the predetermined event occurs, (i) the second control unit shifts the state of the image forming apparatus from the standby state to the suspended state by storing the process information of the image forming apparatus in a volatile storage unit, and (ii) the first control unit stores the process information of the image forming apparatus in a non-volatile storage unit, and wherein the first control unit restores the process information from the non-volatile storage unit to the image forming apparatus if turning on the image forming apparatus is instructed while the image forming apparatus is in the turned-off state.

7. The control method according to claim 6, wherein the second control unit sets a flag in a case where turning off the image forming apparatus is instructed while the image forming apparatus is in the suspended state, and wherein, in a case where the flag is set, the first control unit restores, to the volatile storage unit, the process information stored in the non-volatile storage unit.

8. The control method according to claim 5, wherein, in a case where the predetermined event occurs in the standby state, the first control unit executes flush processing for a cache arranged in the storage unit before the second control unit shifts the image forming apparatus to the suspended state.

* * * * *